United States Patent
Blasi et al.

(10) Patent No.: US 11,653,207 B2
(45) Date of Patent: May 16, 2023

(54) AUTOMATIC AUTHENTICATION OF WIRELESS DEVICES

(71) Applicant: Charter Communications Operating, LLC, St. Louis, MO (US)

(72) Inventors: Scott Blasi, Littleton, CO (US); Sarai Worsham, Littleton, CO (US); Christopher Cuttitta, Golden, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 114 days.

(21) Appl. No.: 17/186,299

(22) Filed: Feb. 26, 2021

(65) Prior Publication Data

US 2022/0279351 A1 Sep. 1, 2022

(51) Int. Cl.
*H04W 12/084* (2021.01)
*H04W 12/71* (2021.01)
*H04W 12/122* (2021.01)

(52) U.S. Cl.
CPC ....... *H04W 12/084* (2021.01); *H04W 12/122* (2021.01); *H04W 12/71* (2021.01)

(58) Field of Classification Search
CPC ..... H04L 63/0815; H04L 63/08; H04L 63/18; H04L 63/102; H04L 63/105; H04W 12/08; H04W 12/122; H04W 12/06; H04W 12/084; H04W 12/71; G06F 21/41; G06F 2221/2139

See application file for complete search history.

(56) References Cited

U.S. PATENT DOCUMENTS

| | | | |
|---|---|---|---|
| 9,514,458 B2 * | 12/2016 | Rutherford | G06Q 20/341 |
| 10,270,759 B1 * | 4/2019 | Bordelon | G06F 9/4843 |
| 10,911,443 B2 * | 2/2021 | Rosendal | H04L 63/0853 |
| 11,245,683 B2 * | 2/2022 | Gujarathi | H04L 63/0823 |
| 11,438,764 B2 * | 9/2022 | Avetisov | H04W 12/068 |
| 2005/0096048 A1 * | 5/2005 | Clare | H04W 12/062 455/433 |

(Continued)

FOREIGN PATENT DOCUMENTS

| | | | | |
|---|---|---|---|---|
| AU | 2015393435 B2 * | 1/2020 | | G06F 21/335 |
| WO | WO-2017087168 A1 * | 5/2017 | | H04L 63/08 |

*Primary Examiner* — Lizbeth Torres-Diaz
(74) *Attorney, Agent, or Firm* — Mendelsohn Dunleavy, P.C.; Steve Mendelsohn

(57) ABSTRACT

In certain embodiments, a service provider provides both wireless communication services to a wireless device and access to a network server associated with an application running on the wireless device. Network infrastructure of the service provider stores registration information about the wireless device in a provider database, receives from the wireless device an initial request for the application to access the network infrastructure, wherein the initial request includes device ID information identifying the wireless device but not explicit authentication information about a user of the wireless device, uses the device information to access the provider database to determine that the wireless device is registered, and transmits to the wireless device permission for the application to access the network infrastructure, thereby enabling the user to access the network infrastructure without having to provide explicit authentication information such as username and password.

17 Claims, 3 Drawing Sheets

(56) References Cited

U.S. PATENT DOCUMENTS

| | | | |
|---|---|---|---|
| 2008/0175393 A1* | 7/2008 | Oba | H04L 63/062 |
| | | | 380/279 |
| 2014/0315518 A1* | 10/2014 | Engelhart | H04L 63/0869 |
| | | | 455/411 |
| 2016/0095017 A1* | 3/2016 | Ely | H04W 12/08 |
| | | | 455/454 |
| 2016/0105420 A1* | 4/2016 | Engan | H04W 12/068 |
| | | | 455/411 |
| 2017/0075791 A1* | 3/2017 | Ramakrishna | G06Q 10/06 |
| 2022/0006801 A1* | 1/2022 | Jankowski | H04L 63/0807 |
| 2022/0038448 A1* | 2/2022 | DeFilippo | H04L 67/12 |
| 2022/0279351 A1* | 9/2022 | Blasi | H04W 12/084 |

* cited by examiner

AUTOMATIC AUTHENTICATION OF WIRELESS DEVICES

BACKGROUND

Field of the Disclosure

The present disclosure relates to telecommunications and, more specifically but not exclusively, to the authentication of wireless devices, such as mobile phones, requesting access to network services.

Description of the Related Art

This section introduces aspects that may help facilitate a better understanding of the disclosure. Accordingly, the statements of this section are to be read in this light and are not to be understood as admissions about what is prior art or what is not prior art.

It is known for the user of a wireless device, such as a mobile phone, to access a network server using an application (aka app) running on the device. In order to ensure that the user is authorized to access that server, it is common to require the user to provide explicit authentication information, such as the user's username and password, prior to being granted initial permission for the requested access. After securing such initial permission, it is known to provide users with options for granting easier subsequent permission via biometric authentication, "remember me" or "keep me signed in" mechanisms, or other means of accessing those network servers using their wireless devices. Even in the use case where the provider of the application and the network server to which the user is requesting access via the app is the same company as the wireless service provider for the user's wireless device, the user must provide explicit authentication information, such as username and password, in order to secure initial permission for the requested access.

FIG. 1 is a signal flow diagram that represents the sequence of steps associated with one conventional technique for the user 110 of a wireless device 120 to access a network server (not shown in FIG. 1) for the use case in which the wireless communication service provider 130 for the wireless device 120 is also the provider of the application and the network server to which the user is requesting access.

In Step 1, the wireless device 120 is shipped to the user 110. In Step 2, the user 110 establishes a username and password with the service provider 130. In Step 3, the service provider 130 stores the user's username and password, and, in some implementations, the user's security questions and answers and contact information, in its local database 132 for future use.

In Step 4, the user 110 opens the service provider's app on the wireless device 120 and is required to sign in. In Step 5, the user 110 uses the wireless device 120 to transmit her username and password to the service provider 130. In Step 6, the service provider 130 accesses the user's username and password in its local database 132 to verify that the user 110 is authorized to access the network server. In Step 7, the service provider 130 transmits a message to the wireless device 120 granting permission to use the application to access the network server.

According to this technique, the user 110 must enter her username and password to gain access to the network server even when the application and the network server are provided by the same company that operates the service provider 130 for the user's wireless device 120.

SUMMARY

Problems in the prior art are addressed in accordance with the principles of the present disclosure by enabling certain users to use certain wireless devices to access certain network servers without having to provide explicit authentication information, such as username and password, even for the initial access of those network servers. For example, when the provider of the network server and the application that accesses the network server is the same company as the service provider for the user's wireless device, the user is able to use the application running on the wireless device to secure initial permission to access the network server without having to provide her username and password or any other explicit authentication information. As used herein, the term "explicit authentication information" refers to information used to determine whether to grant permission to the user to access, e.g., a network server, where the information is provided by a user manually, verbally, or otherwise to an application running on a wireless device by actively interacting with the wireless device in real time (i.e., at the time of the user uses the device to transmit the request for the access). Note that a user making herself available for biometric authentication, such as via a fingerprint or a retina scan, is also an example of a user providing explicit authentication information.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
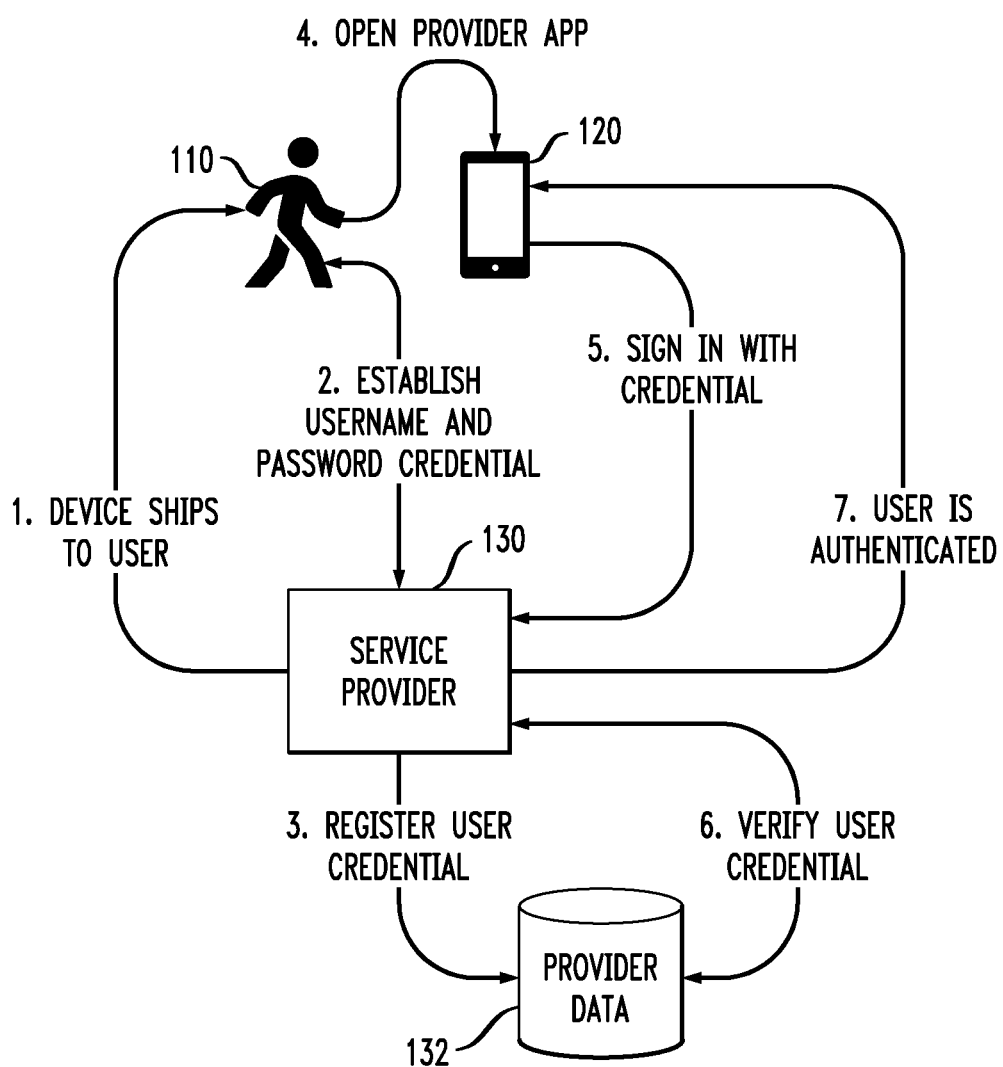
FIG. 1 is a signal flow diagram that represents the sequence steps associated with one conventional technique for a user of a wireless device to access a network server for the use case in which the wireless communication service provider for the wireless device is also the provider of the application and the network server to which the user is requesting access.
Figure 2:
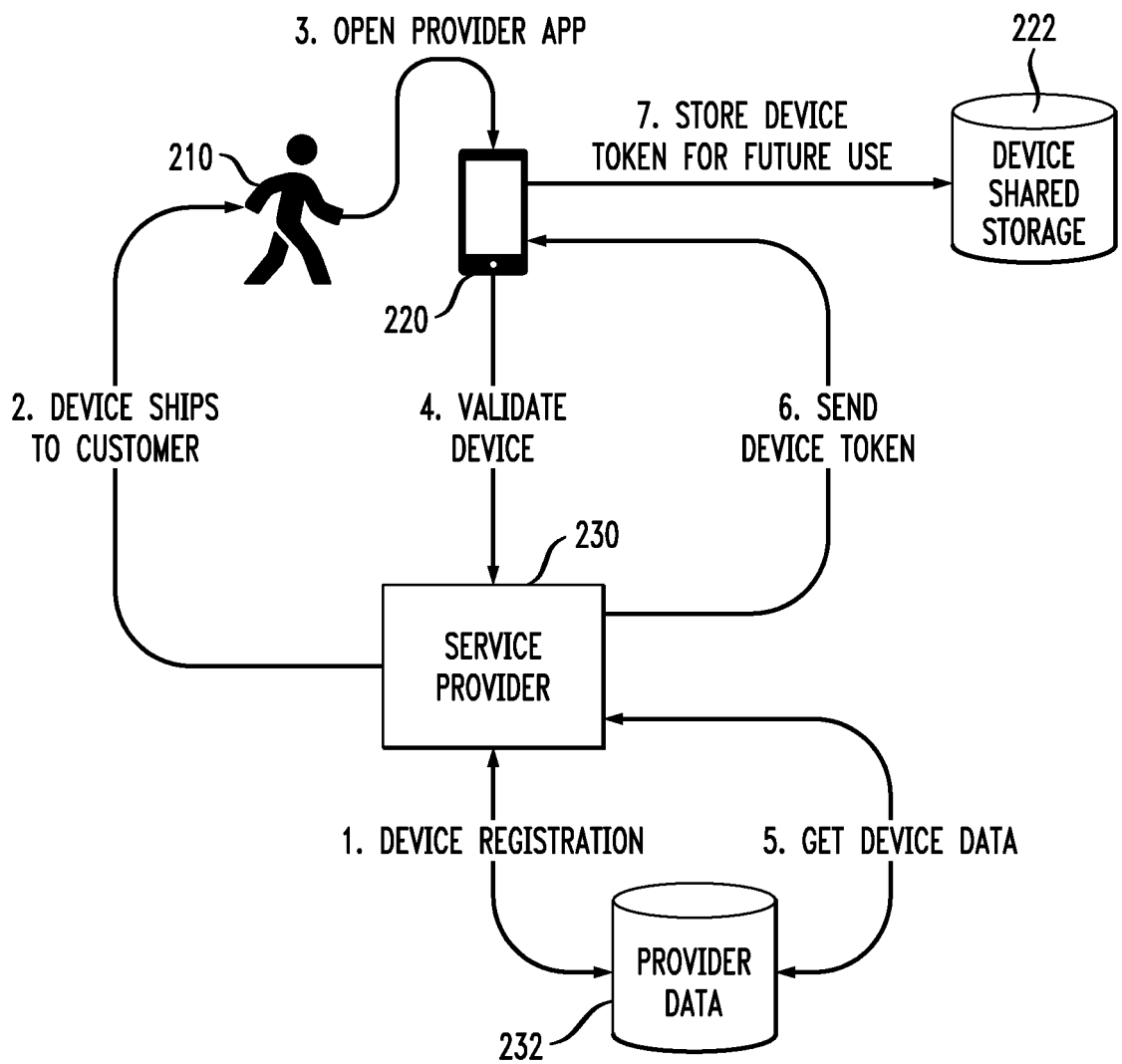
FIG. 2 is a signal flow diagram that represents the sequence steps associated with one possible Wireless Device Automatic Authentication (WDAA) technique for a user of a wireless device to use an application running on the wireless device to access a network server for the same use case as in FIG. 1.

FIG. 2 is a signal flow diagram that represents the sequence steps associated with one possible Wireless Device Automatic Authentication (WDAA) technique for a user 210 of a wireless device 220 to use an application running on the wireless device 220 to access a network server (not shown in FIG. 2) for the use case in which the wireless communication service provider 230 for the wireless device 220 is also the provider of the application and the network server to which the user 210 is requesting access. This WDAA technique enables a provider-developed mobile application installed on a provider-issued wireless device 220 to negotiate a credential with an authentication server of the service provider 230 without the user 210 initially providing explicit authentication information, such as a username and password. In this way, the application is granted permission to access subscriber and/or device data that can be used to receive a device token using the wireless device's Short Message Service (SMS) as a means to validate the device. Once the initial device validation process is complete, the provider-developed application can access the device-level provider-specific application-shared storage 222 to retrieve the stored device token for subsequent authentication events of the application and authorizing the use of service provider APIs.

In Step 1 of FIG. 2, the service provider 230 registers a wireless device 220 by storing data associated with the device (e.g., the device's International Mobile Equipment Identity (IMEI) number that uniquely identifies the wireless device 220, the Integrated Circuit Card Identifier (ICCID) used as a unique serial number for the device's Subscriber Identification Module (SIM) card, and the Mobile Station International Subscriber Directory Number (MSISDN) that internationally identifies the device's phone number, and/or the user's customer account number) in a service provider database 232. In Step 2, the wireless device 220 is shipped to the user 210. In Step 3, the user 210 opens the application provided by the service provider 230 on the wireless device 220. Note that the application may come pre-installed on the wireless device 220 or be subsequently downloaded to the wireless device 220 by the user 210 from the service provider 230 using steps that are not shown in FIG. 2.

In Step 4, the application automatically causes the wireless device 220 to transmit a request to the service provider 230 to validate the device. Note that the request includes information uniquely identifying the wireless device 220 (e.g., the device's IMEI, ICCID, and/or MSISDN numbers). In Step 5, the service provider 230 uses the device's identification information to access the service provider database 232 to determine whether the wireless device 220 is already registered with the service provider. For example, in one possible implementation, information about each registered wireless device is stored in the service provider database 232, where that information can be accessed using the device's IMEI number. In that case, in Step 5, the service provider 230 uses the IMEI number in the received request to access the service provider database 232, retrieve the device's MSISDN and ICCID numbers and the user's customer account number from the service provider database 232, and compare those values to the corresponding values in the received request to confirm whether the wireless device 220 is already registered with the service provider.

Since the wireless device 220 is already registered, in Step 6, the service provider 230 generates and transmits a device token (i.e., a signed, cryptographic token containing metadata representing given company-unique identifiers) via SMS messaging to the application on the wireless device 220. Depending on the particular implementation, the SMS message contains only the signed device token that has been subsequently encrypted, which includes user-identifying information such as the user's customer account number. In Step 7, after decrypting the encrypted, signed device token, the application stores, for future use, the decrypted, signed device token in the device's provider-specific application-shared storage 222, which is storage that exists on the device itself that only specific applications can access. In particular, in subsequent sessions in which the user 210 uses the device's application to access the service provider's network server, the application will automatically cause the wireless device 220 to retrieve the device token (if available and non-expired) from the device's provider-specific application-shared storage 222 and transmit the device token to the service provider 230 to secure authorization to access the network server.

In this way, the WDAA technique shown in FIG. 2 enables the user of a wireless device to use a device application to access a network server without requiring the user to provide explicit authentication information for the use case in which the service provider of the wireless device is also the provider of the application and the network server.

Note that, in some implementations, if a wireless device is not already registered (e.g., when the wireless device is from a company other than the service provider 230), then, in response to Step 4, the service provider 230 will access its database 232, determine that the wireless device is not registered, and transmit a rejection message back to the device's application. The wireless device will then prompt the user to provide explicit authentication information (e.g., username and password) to be transmitted to the service provider 230 in order to secure authorization for the device to access the service provider's network server.

Figure 3:
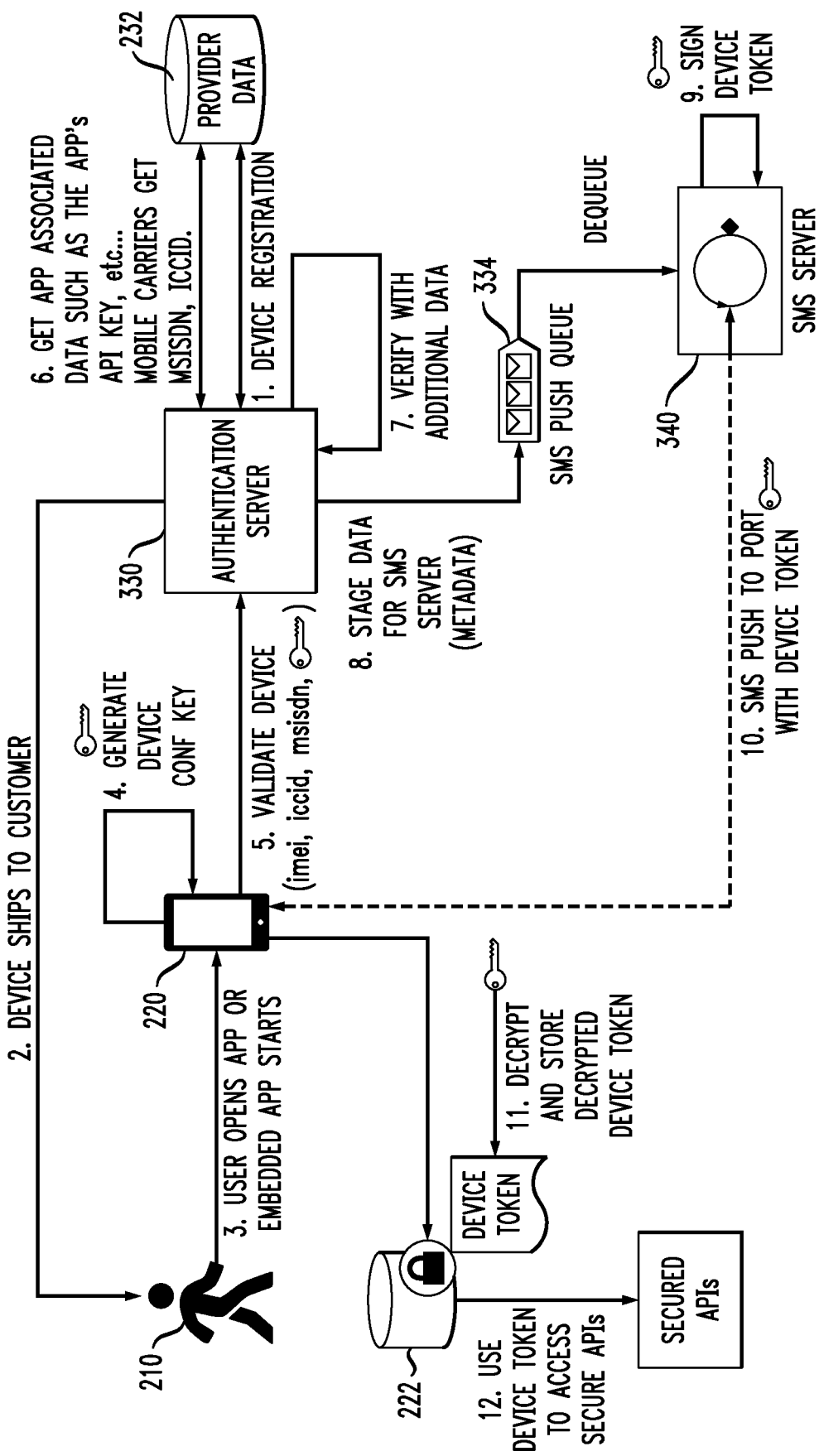
FIG. 3 is a more-detailed signal flow diagram that represents the sequence steps associated with the WDAA technique of FIG. 2.

FIG. 3 is a more-detailed signal flow diagram that represents the sequence steps associated with the WDAA technique of FIG. 2 for the user 210 of the wireless device 220 to use the device application to access the network server (not shown in FIG. 3) for the use case in which the service provider of the wireless device 220 is also the provider of the application and the network server to which the user is requesting access.

In Step 1 of FIG. 3, an authentication server 330 operated by the service provider 230 registers the wireless device 220. In Step 2, the wireless device 220 is shipped to the user 210.

In Step 3, the device application is opened either (i) manually by the user 210 or (ii) automatically when the wireless device 220 is powered on. In Step 4, the application generates an encryption key (i.e., a cryptographic key used to encrypt and thereby protect the confidentiality of a given payload) using an accepted secure algorithm such as AES-256. This encryption key, which can be symmetric in nature, will be stored on the wireless device 220, accessible only to the application. The encryption key is passed to the server in this process and will be used to encrypt the signed device token at the server in Step 9 and subsequently decrypt the insecure channel-delivered token at the client in Step 11 (where the key was originally generated). This ensures that only the party that initiated the first call will be able to decrypt the device token for storage/usage.

In Step 5, the wireless device 220 transmits a "validate device" request to the service provider's authentication server 330. The "validate device" request includes the encryption key and the device's IMEI, ICCID, and MSISDN numbers. The "validate device" request invokes a "validate device" operation on the authentication server 330 using the associated data. This operation will be implemented in a "fire and forget" fashion, and the actual response to this call will return to the wireless device 220 asynchronously over the SMS Push-to-Port mechanism (in Step 10). Using an asynchronous response and targeting the wireless device 220 directly via MSISDN, the WDAA technique of FIG. 3 is protected against being invoked by nefarious parties. With this protection, the response will not return directly to a nefarious caller but will instead be pushed to the appropriate wireless device 220 only.

As used herein, the term "associated data" refers to any data that a company can use to verify the identity of a wireless device and get the associated MSISDN (SMS-able phone number) of the wireless device. Device identifiers like IMEI and ICCID are optional and are typically only available to Mobile Network Operators (MNOs) and Mobile Virtual Network Operators (MNVOs). Device identifiers offer the highest level of trust.

In Step 6, in response to the "fire and forget" call from the wireless device 220, the authentication server 330 queries the service provider's database 232 using the associated data that was received from the wireless device 220. This data is used to get the appropriate account metadata of a valid application user or account associated with this device for use in generating a device token for the wireless device 220. Associated data private to the service provider and related to the wireless device 220 in any way can be used to create a device token, such as a user ID number, the user's customer account number, and/or a confidential and uniquely generated device ID number.

In Step 7, the authentication server 330 authorizes the server access by comparing the associated data received from the wireless device 220 to the data stored in the service provider's database 232, similar to Step 7 of FIG. 2. If the data matches, then the process continues. If the data does not match, then the authentication server 330 records, for example, the time and device information for the failed request. This allows the authentication server 330 to blacklist IP addresses that repeatedly submit non-correlating data.

Assuming that Step 7 verifies a match, in Step 8, the authentication server 330 stages a "SMS Push to Port" event by the SMS server 340 that is operated by the service provider 230 and is responsible for delivering the device token back to the wireless device 220. The SMS push queue 334 will be loaded with the following metadata: the confidentiality-supporting encryption key, the unsigned device token, and the MSISDN used to target the wireless device 220 for which delivery is intended. Note that the token is staged unsigned so as to remove risk associated with an attack against reading the queue 334 itself, resulting in the breach of device tokens en masse. The queue payload itself is signed to ensure against queue write attacks with nefarious MSISDN's and encryption keys being replaced/updated (after the authorization validation process performed in Step 7). This protects against the device token being able to be re-routed to incorrect devices via queue updates/writes. As understood by those skilled in the art, signing an unsigned device token ensures the integrity of the claims within the token.

In Step 9, the SMS server 340 de-queues the next message from the SMS push queue 334 and sign-verifies the queue payload by extracting and signing the account-level device token and encrypting the signed token with the device's specific encryption key. This encryption will protect against the "SMS interception attack vector" since the only other party with the appropriate decryption key is the wireless device 220 that originated the initiating "fire and forget" call in Step 5.

In Step 10, leveraging the MSISDN extracted from the sign-verified queue payload, the SMS server 340 pushes the payload back to the originally intended wireless device 220 at either the static or dynamic/passed port that the application or its associated SDK or Framework is listening on.

In Step 11, the device application awakens on the originating wireless device 220 after receiving the SMS, decrypts the device token, and stores the decrypted device token to a provider-specific, application-shared storage 222 on the wireless device 220. The provider-specific, application-shared storage 222 is accessible only to applications associated with the service provider (i.e., developed by the service provider or one of its partners). The terms "application-shared storage" or "device-level shared storage" are used generically to refer to mobile operating system (OS)-specific storage mechanisms (such as Android's Content-Provider or iOS's key chain) that can be used to provide read/write access for specific applications on that wireless device. In this case, access is restricted to applications associated with the service provider of the wireless device.

In Step 12, the application uses the device token to automatically access the account-level secure data provide by the APIs without the need for the user 210 to enter his/her username and password or use some other form of explicit authentication information.

Since the WDAA technique of FIG. 3 securely stores the device token in the provider-specific, application-shared storage 222, when another application associated with the service provider is opened, the application will check the provider-specific, application-shared storage 222 on the wireless device 220 for an account-level device token, if found, then the application will attempt a backchannel authentication using this device token, prior to presenting the user 210 with a typical authentication that requires the user's username and password being submitted.

Furthermore, this device token proves useful in initiating the credential creation process for the service provider's customers, because the user 210 will not have to provide account-related metadata since that metadata will already be available within the device token to be extracted. This enhancement could greatly simplify and strengthen the credential creation process for users 210.

In some implementations, the device token lifespan is set to a limited amount of time, and a variation of the process described above is initiated periodically by the application to "renew" the device token at some interval, for example, by the first application that recognizes the expiration of the device token.

In some implementations, only applications associated with the service provider will be able to read from provider-specific, application-shared storage 222 on the wireless device 220.

As used herein, the term "network infrastructure" is used to refer collectively to apparatus that supports processing associated with the present disclosure. For example, in the context of the embodiment shown in FIG. 3, the network infrastructure includes the authentication server 330 and the SMS server 340 as well as the server(s) (not shown in FIG. 3) that support the application(s), all of which are operated by the service provider 230 of FIG. 2.

In certain embodiments, the present disclosure is network infrastructure supporting an application configured to run on a wireless device. The network infrastructure is configured to store registration information about the wireless device in a provider database; then receive from the wireless device an initial request for the application to access the network infrastructure, wherein the initial request includes device ID information identifying the wireless device but not explicit authentication information about a user of the wireless device; use the device information to access the provider database to determine that the wireless device is registered; and transmit to the wireless device permission for the application to access the network infrastructure.

In at least some of the above embodiments, the network infrastructure is configured to transmit to the wireless device a device token associated with the wireless device for use by the application to secure access during subsequent server-accessing sessions without the user having to provide explicit authentication information.

In at least some of the above embodiments, the network infrastructure is configured to receive the initial request from the wireless device via a first communication link; and the network infrastructure is configured to transmit the device token to the wireless device via a second, network-server-infrastructure-initiated communication link, different from the first communication link, to avoid transmitting the device token to a nefarious party that successfully uses the first communication link with metadata for a wireless device the nefarious party does not own.

In at least some of the above embodiments, if the network infrastructure receives the device token from a second application running on the wireless device and supported by network infrastructure, then the network infrastructure uses the device token to grant permission to the second application without the user having to provide explicit authentication information.

In at least some of the above embodiments, the network infrastructure is configured to store the registration information about the wireless device in the provider database prior to the wireless device being provided to the user.

In certain embodiments, the present disclosure is a wireless device configured to run an application that accesses a network infrastructure. The wireless device is configured to transmit to the network infrastructure an initial request for the application to access the network infrastructure, wherein the initial request includes device information identifying the wireless device but not explicit authentication information about a user of the wireless device; and receive from the network infrastructure permission for the application to access the network infrastructure.

In at least some of the above embodiments, the wireless device is configured to receive from the network infrastructure a device token associated with the wireless device granting the permission for the application to access to the network infrastructure; store the device token; and subsequently transmit the device token to the network infrastructure to secure access to the network infrastructure during subsequent server-accessing sessions without the user having to provide explicit authentication information.

In at least some of the above embodiments, the wireless device is configured to transmit the initial request to the network infrastructure via a first communication link; and the wireless device is configured to receive the device token from the network infrastructure using a second, network-server-infrastructure-initiated communication link, different from the first communication link.

In at least some of the above embodiments, a second application, running on the wireless device and supported by the network infrastructure, is configured to transmit the device token to the network infrastructure to secure permission for the second application without the user having to provide explicit authentication information.

In at least some of the above embodiments, the wireless device is configured to store the device token in device application-shared storage.

In at least some of the above embodiments, the device application-shared storage is accessible only to applications supported by the network infrastructure.

In at least some of the above embodiments, the device token stored in the device application-shared storage by a first application supported by the network infrastructure is accessible and usable for authentication by a second application running on the wireless device and supported by the network infrastructure.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred—to have to be in a corresponding order or sequence, either temporally, spatially, in ranking, or in any other manner.

What is claimed is:

1. A system comprising a network infrastructure supporting an application configured to run on a wireless device, the network infrastructure configured to:

store registration information about the wireless device in a provider database;
then receive from the wireless device an initial request for the application to access the network infrastructure, wherein the initial request includes device identifier (ID) information identifying the wireless device but not explicit authentication information about a user of the wireless device;
use the device ID information to access the provider database to determine that the wireless device is registered;
transmit to the wireless device a device token associated with the wireless device during an initial server-accessing session by the application, wherein permission is granted for the application to access the network infrastructure without receiving the explicit authentication information from the user; and
receive the device token from the wireless device to secure access during subsequent server-accessing sessions by the application without receiving the explicit authentication information from the user.

2. The system of claim 1, wherein:
the network infrastructure is configured to receive the initial request from the wireless device via a first communication link; and
the network infrastructure is configured to transmit the device token to the wireless device via a second, network-server-infrastructure-initiated communication link, different from the first communication link, to avoid transmitting the device token to a second party that successfully uses the first communication link for a wireless device the second party does not own.

3. The system of claim 1, wherein, in response to the network infrastructure receiving the device token from a second application running on the wireless device, different from the application, and supported by the network infrastructure, the network infrastructure uses the device token to grant permission to the second application without receiving the explicit authentication information from the user.

4. The system of claim 1, wherein the network infrastructure is configured to store the registration information about the wireless device in the provider database prior to the wireless device being provided to the user.

5. The system of claim 1, wherein:
the network infrastructure is associated with a first company that provided the wireless device; and
the network infrastructure is configured to require receipt of explicit authentication information about a second user of a second wireless device provided by a second company different from the first company before providing access to the network infrastructure by the same application running on the second wireless device.

6. A wireless device configured to run an application that accesses a network infrastructure, the wireless device configured to:
transmit to the network infrastructure an initial request for the application to access the network infrastructure, wherein the initial request includes device identifier (ID) information identifying the wireless device but not explicit authentication information about a user of the wireless device;
receive from the network infrastructure a device token associated with the wireless device during an initial server-accessing session by the application, wherein permission is received for the application to access the network infrastructure without transmitting the explicit authentication information from the user;
store the device token; and
subsequently transmit the device token to the network infrastructure to secure access to the network infrastructure during subsequent server-accessing sessions without transmitting the explicit authentication information from the user.

7. The wireless device of claim 6, wherein:
the wireless device is configured to transmit the initial request to the network infrastructure via a first communication link; and
the wireless device is configured to receive the device token from the network infrastructure using a second, network-server-infrastructure-initiated communication link, different from the first communication link.

8. The wireless device of claim 6, wherein a second application, running on the wireless device, different from the application, and supported by the network infrastructure, is configured to transmit the device token to the network infrastructure to secure permission for the second application without transmitting the explicit authentication information from the user.

9. The wireless device of claim 6, wherein the wireless device is configured to store the device token in device application-shared storage.

10. The wireless device of claim 9, wherein the device application-shared storage is accessible only to applications supported by the network infrastructure.

11. The wireless device of claim 10, wherein the device token stored in the device application-shared storage by a first application supported by the network infrastructure is accessible and usable for authentication by a second application running on the wireless device and supported by the network infrastructure.

12. A method performed by network infrastructure that supports an application configured to run on a wireless device, the method comprising the network infrastructure:
storing registration information about the wireless device in a provider database;
then receiving from the wireless device an initial request for the application to access the network infrastructure, wherein the initial request includes device identifier (ID) information identifying the wireless device but not explicit authentication information about a user of the wireless device;
using the device ID information to access the provider database to determine that the wireless device is registered; and
transmitting to the wireless device a device token associated with the wireless device during an initial server-accessing session by the application, wherein permission is granted for the application to access the network server without receiving the explicit authentication information from the user; and
receiving the device token from the wireless device to secure access during subsequent server-accessing sessions by the application without receiving the explicit authentication information from the user.

13. The method of claim 12, wherein:
the network infrastructure receives the initial request from the wireless device via a first communication link; and
the network infrastructure transmits the device token to the wireless device via a second, network-server-infrastructure-initiated communication link, different from the first communication link, to avoid transmitting the device token to a second party that successfully uses the first communication link for a wireless device the second party does not own.

14. The method of claim 12, wherein, in response to the network infrastructure receiving the device token from a second application running on the wireless device, different from the application, and supported by the network infrastructure, the network infrastructure uses the device token to grant permission to the second application to access the network infrastructure without receiving the explicit authentication information from the user.

15. The method of claim 12, wherein the network infrastructure stores the registration information about the wireless device in the provider database prior to the wireless device being provided to the user.

16. The method of claim 12, wherein:
the network infrastructure is associated with a first company that provided the wireless device; and
the network infrastructure requires receipt of explicit authentication information about a second user of a second wireless device provided by a second company different from the first company before providing access to the network infrastructure by the same application running on the second wireless device.

17. A non-transitory machine-readable storage medium, having encoded thereon program code, wherein, when the program code is executed by network infrastructure, wherein the network infrastructure supports an application configured to run on a wireless device, the method comprising the network infrastructure:
storing registration information about the wireless device in a provider database;
then receiving from the wireless device an initial request for the application to access the network infrastructure, wherein the initial request includes device identifier (ID) information identifying the wireless device but not explicit authentication information about a user of the wireless device;
using the device ID information to access the provider database to determine that the wireless device is registered;
transmitting to the wireless device a device token associated with the wireless device during an initial server-accessing session by the application, wherein permission is granted for the application to access the network infrastructure without receiving the explicit authentication information from the user; and
receiving the device token from the wireless device to secure access during subsequent server-accessing sessions by the application without receiving the explicit authentication information from the user.

* * * * *